(12) United States Patent
Wang et al.

(10) Patent No.: US 10,097,376 B2
(45) Date of Patent: Oct. 9, 2018

(54) RESILIENT VIRTUAL OPTICAL SWITCHES OVER LESS RELIABLE OPTICAL NETWORKS

(71) Applicant: Fujitsu Limited, Kawasaki-shi, Kanagawa (JP)

(72) Inventors: Xi Wang, Murphy, TX (US); Paparao Palacharla, Richardson, TX (US); Qiong Zhang, Plano, TX (US); Inwoong Kim, Allen, TX (US); Tadashi Ikeuchi, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 15/423,098

(22) Filed: Feb. 2, 2017

(65) Prior Publication Data
US 2017/0288905 A1 Oct. 5, 2017

Related U.S. Application Data

(60) Provisional application No. 62/316,152, filed on Mar. 31, 2016.

(51) Int. Cl.
*H04B 17/00* (2015.01)
*H04L 12/46* (2006.01)
(Continued)

(52) U.S. Cl.
CPC ....... *H04L 12/4641* (2013.01); *H04B 10/079* (2013.01); *H04J 14/0201* (2013.01);
(Continued)

(58) Field of Classification Search
CPC ............ H04L 12/4641; H04L 43/0894; H04L 43/0811; H04L 41/0806; H04L 41/0896;
(Continued)

(56) References Cited

U.S. PATENT DOCUMENTS 9,444,550 B2 9/2016 Wang et al.
2014/0098673 A1* 4/2014 Lee .................... H04L 45/64
370/238
(Continued)

OTHER PUBLICATIONS

Meixner, "Disaster-resilient virtual-network mapping and adaptation in optical networks" 2013 17th International Conference on Optical Networking Design and Modeling (ONDM), year: 2013 pp. 107-112.*
(Continued)

*Primary Examiner* — Juan A Torres
(74) *Attorney, Agent, or Firm* — Baker Botts L.L.P.

(57) ABSTRACT

In one or more embodiments, one or more systems of a physical optical network that may implement and/or manage a virtual optical network (VON) that interconnects multiple data centers. Virtual nodes based the multiple data centers to be interconnected may be determined, and each of the virtual nodes may be mapped to at least two physical nodes of the physical optical network. Virtual links for pairs of the virtual nodes may be determined, and each virtual link may be mapped to at least one optical network connection of the physical optical network. At least one of a physical node impairment and an optical network connection impairment that is associated with a first physical node implementing a first virtual node may be detected, and the first virtual node may be implemented via a second physical node.

20 Claims, 10 Drawing Sheets

(51) Int. Cl.
*H04B 10/079* (2013.01)
*H04J 14/02* (2006.01)
*H04L 12/26* (2006.01)
*H04L 12/751* (2013.01)
*H04Q 11/00* (2006.01)
*H04L 12/24* (2006.01)

(52) U.S. Cl.
CPC ...... *H04L 41/0806* (2013.01); *H04L 41/0896* (2013.01); *H04L 43/0811* (2013.01); *H04L 43/0894* (2013.01); *H04L 45/02* (2013.01); *H04Q 11/0066* (2013.01); *H04Q 2011/0073* (2013.01); *H04Q 2011/0086* (2013.01)

(58) Field of Classification Search
CPC ............... H04L 45/02; H04Q 11/0066; H04Q 2011/0073; H04Q 2011/0086; H04J 14/0201; H04B 10/079
USPC .......................................................... 398/17
See application file for complete search history.

(56) References Cited

U.S. PATENT DOCUMENTS

2014/0099119 A1* 4/2014 Wei ..................... H04J 14/0257
398/79
2015/0043915 A1* 2/2015 Patel ..................... H04L 45/302
398/68
2017/0078152 A1* 3/2017 Ahmed .................. H04L 41/12

OTHER PUBLICATIONS

Tzanakaki, "Dynamic Virtual Optical Networks Supporting Uncertain Traffic Demands," JOCN vol. 5, Issue 10, pp. A76-A85 (2013).*
Kong, "Availability-Guaranteed Virtual Optical Network Mapping with Selective Path Protection," OFC 2016, Mar. 20-24, Paper W1B.4.*
Matsumoto, "The Optical White Box Is Coming" Apr. 3, 2015.*
X. Wang, et al., "Virtual Network Provisioning over Distance-Adaptive Flexible-Grid Optical Networks," JOCN, 2015; 8 pages, Feb. 2, 2015.
W. Xie, et al., "Survivable Virtual Optical Network Mapping in Flexible-Grid Optical Networks," ICNC 2014; 7 pages, 2014.
X. Wang, et al., "Scalable Virtual Optical Network Mapping over Software-Defined Flexible Grid Optical Networks," ACP 2015; 3 pages, 2015.
Wang, Xi, et al. "Resilient virtual optical network provisioning over software-defined optical networks." OptoElectronics and Communications Conference (OECC) held jointly with 2016 International Conference on Photonics in Switching (PS), 2016 21st. IEEE, 2016; 3 pages.

* cited by examiner

RESILIENT VIRTUAL OPTICAL SWITCHES OVER LESS RELIABLE OPTICAL NETWORKS

PRIORITY CLAIM

The Present application claims the benefit of priority from U.S. Provisional Patent Application Ser. No. 62/316,152, filed 31 Mar. 2016, entitled "RESILIENT VIRTUAL OPTICAL SWITCHES OVER LESS RELIABLE OPTICAL NETWORKS", which is hereby incorporated by reference for all purposes.

BACKGROUND

Field of the Disclosure

The present disclosure relates generally to optical communication networks and, more particularly, to virtual optical networks.

Description of the Related Art

An increasing number of geographically distributed datacenters are being interconnected via optical networks, forming wide-area information and communications technology (ICT) infrastructures. Cloud applications such as video content distribution, social networking, and online gaming, among others, rely heavily on such ICT infrastructures for improved service quality as well as users' qualities of experiences. Such demands drive the need for optical networks with higher capacity, flexibility, and dynamic bandwidth reconfigurability with limited time scales under cloud orchestration systems using software-defined networking (SDN).

Resiliency continues to be a service attribute in optical networking, and virtual optical networks (VONs) are expected to offer high levels of service resiliency as well. However, virtual optical network (VON) resiliency solutions assume "reasonably reliable" physical optical networks, where failures usually occur one-at-a-time. New challenges arise when network operators choose to build optical networks with multi-vendor, mixed-reliability equipment.

SUMMARY

The present disclosure provides one or more systems, of a physical optical network, that may implement and/or manage a virtual optical network (VON) that interconnects multiple data centers, according to one or more embodiments. A disclosed method that implements and/or manages the VON may include determining virtual nodes based on the multiple data centers to be interconnected. Each of the virtual nodes may be mapped to at least two physical nodes of the physical optical network, and the physical nodes may be provisioned. Virtual links for pairs of the virtual nodes may be determined. Each virtual link may be mapped to at least one optical network connection of the physical optical network, and each optical network connection mapped to the virtual links may be provisioned. At least one of a physical node impairment and an optical network connection impairment that is associated with a first physical node implementing a first virtual node may be detected, and the first virtual node may be implemented via a second physical node. In one or more embodiments, the first virtual node may be implemented via the first physical node based on first connectivity to a first data center of the data centers, where the first connectivity is based on at least one of a first number of spectrum slots (e.g., wavelengths) and a first bandwidth, among others. The second physical node may be determined as a backup physical node for the first virtual node based on second connectivity to the first data center, where the second connectivity is based on at least one of a second number of spectrum slots and a second bandwidth. For example, at least one of the first number of spectrum slots and the first bandwidth may be different from a respective one of the second number of spectrum slots and the second bandwidth.

Additional disclosed aspects that implement and/or manage a VON that interconnects multiple data centers include a system that implements and/or manages the VON that interconnect the multiple data centers and a non-transitory computer readable memory device and/or medium storing processor-executable instructions, as described herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
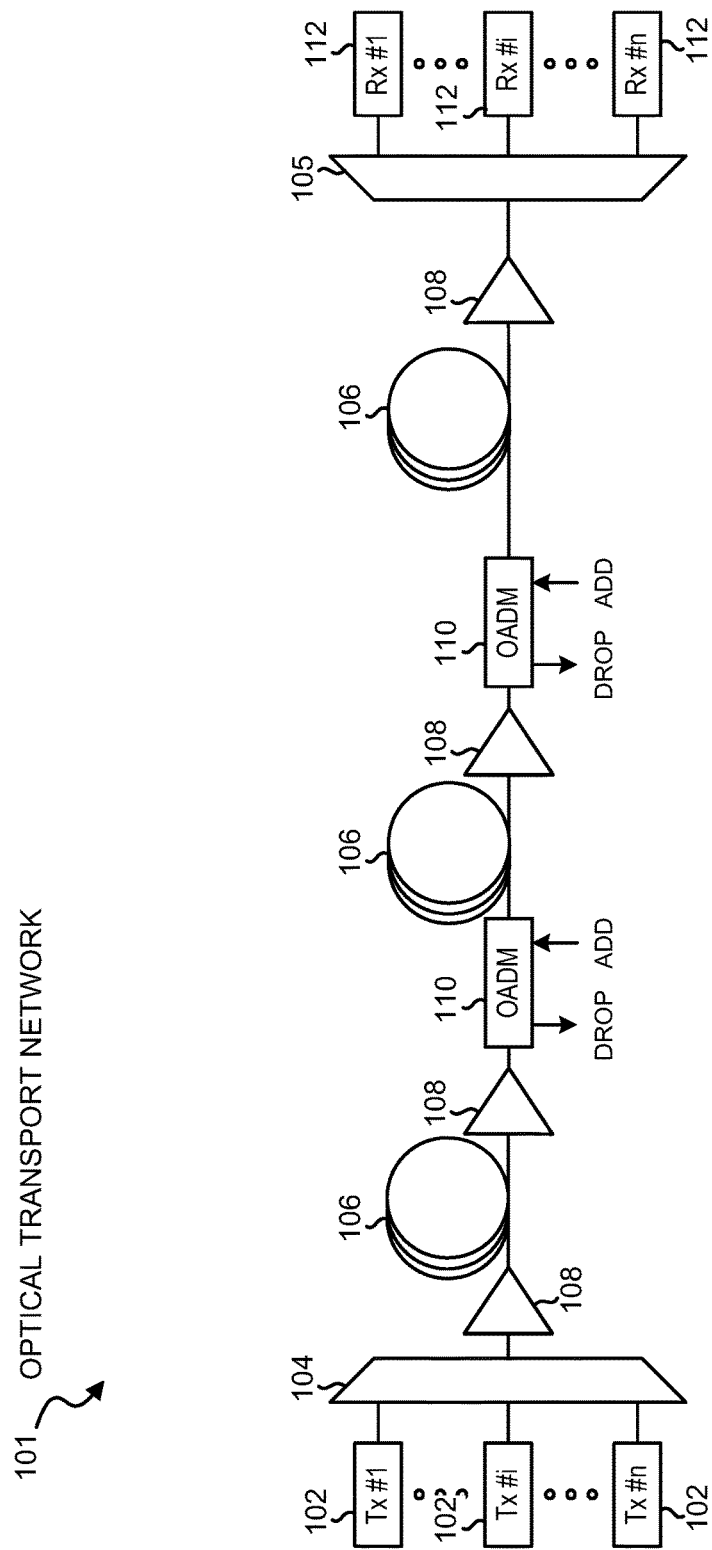
FIG. 1 provides a block diagram of selected elements, according to one or more embodiments.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), widget "12-1" refers to an instance of a widget class, which may be referred to collectively as widgets "12" and any one of which may be referred to generically as a widget "12". In the figures and the description, like numerals are intended to represent like elements.

In one or more embodiments, in a Software-Defined Optical Network (SDON), network services may be provided as virtual optical networks (VONs), instead of lightpaths, and virtual optical network (VON) provisioning may be distinguishable from conventional lightpath provisioning.

For example, a lightpath may be a point-to-point connection, while a VON may include a network that includes multiple virtual nodes and virtual links. For instance, a lightpath may correspond to a fixed first physical node and a fixed second physical node.

In one or more embodiments, each virtual node in a VON may be mapped to one or more physical optical nodes, and each virtual link of a VON may be mapped to a lightpath coupling corresponding physical optical nodes. For example, a virtual node may be mapped to any physical node within a geographic area or among a number of specified physical nodes, as long as a resulting physical SDON slice satisfies the service-level agreement of the VON. In one or more embodiments, in a VON, a virtual node to physical node mapping may be flexible. For example, such flexibility may empower a network service provider to optimize resource usage, reduce service provisioning costs, and/or provide greater resiliency. For instance, the flexibility of VONs may empower network operators to optimize resource utilization while offering agility and programmability tailored to individual services.

In one or more embodiments, VON provisioning may generalize a concept of optical networking service from point-to-point fixed-node-pair lightpath provisioning to multi-point flexible-nodes, or group optical network slicing. For example, as a lightpath may be a particular instance of a VON including two virtual nodes, each with a fixed node mapping, an SDON service provider may have backward-compatibility to lightpath provisioning with little to no modification of its VON service provisioning system.

Furthermore, VON provisioning may be subject to unique constraints arising from the underlying physical optical network infrastructure, according to one or more embodiments. In one example, one constraint from a VON request may be a spectral slot constraint, where a continuous lightpath at a given wavelength, referred to as a "spectral slot", is desired by a network customer for a VON request. Because the number of spectral slots within the physical optical network may be limited, optimal VON provisioning may involve consideration of spectral slot availability between physical nodes when performing a mapping. In another example, another VON constraint may involve distance adaptive modulation, where different length lightpaths may be considered within a given VON request. For instance, as a length of a lightpath impacts the cost of the mapping, distance adaptive modulation may be a determining factor between different mapping patterns for a VON request. Additional constraints for VON requests, such as physical layer impairments, where adjacent spectral slots may not be used for certain lightpaths, may also be associated with VON provisioning.

Moreover, VON provisioning may be associated with general provisioning constraints, according to one or more embodiments. For example, a VON request may be limited to assignment of a physical node to at most one virtual node specified in the VON request. In one instance, each virtual link between two virtual nodes in the VON request may be subject to a virtual link capacity constraint for the physical infrastructure. In another instance, a VON request may specify certain candidate physical nodes, which may constrain mapping choices.

In one or more embodiments, resiliency may be a service attribute in optical networking, and VONs may be expected to offer service resiliency as well, although the VONs may be implemented with "whiteboxes". For example, whiteboxes may be similar to bare metal generic personal computers (PCs), sold by multiple vendors, varying in quality and price. Notwithstanding some vendors may strive to offer whiteboxes with excellent reliability, products from some other vendors and/or some low-end models may have less satisfactory (or even unpredictable) reliability.

In one or more embodiments, one or more virtualization capabilities of a SDON may be utilized in providing resilient virtual optical nodes from less-reliable physical optical nodes. For example, a virtual optical node may include virtual nodes and virtual optical connections (e.g., virtual links). For instance, each of the virtual nodes may be mapped to two or more physical nodes, and a virtual optical connection, linking a pair of virtual nodes, is mapped to an optical network connection that may communicatively couple a corresponding physical node pair mapped by a virtual node pair.

In one or more embodiments, a virtual node to physical node mapping and/or a virtual optical connection to optical network connection mapping may be dynamically updated under network impairments and/or failures. For example, an availability of a virtual node may be improved compared to the physical nodes that implement the virtual nodes. For instance, such reliable virtual nodes may offer high-availability virtual optical network services. In one or more embodiments, a virtualized single big optical switch (vSBOS) service may be offered utilizing a virtual optical node. For example, a datacenter operator may request a vSBOS to interconnect geographically distributed data centers. For instance, the geographically distributed data centers may appear to be connected to a single "optical" switching hub.

In one or more embodiments, in response to a vSBOS service request, a dedicated virtual optical node may be created. For example, each virtual node of the virtual optical node may be mapped to a primary physical node and to one or more backup physical nodes, and each virtual optical connection may be mapped to a primary optical network connection and to one or more backup optical network connections, based on connectivity from the physical nodes to the data centers interconnected via the virtual optical node. For instance, after the virtual nodes and the virtual optical connections are mapped, the vSBOS service may be activated. In one or more embodiments, in response to an impairment and/or a failure of one or more of a physical node and an optical network connection, a virtual node associated with the impairment and/or the failure and/or a virtual optical connection associated the impairment and/or the failure may be implemented with a respective backup.

Turning now to the drawings, FIG. 1 illustrates an example embodiment of an optical transport network 101, which may represent an optical communication system. Optical transport network 101 may include one or more optical fibers 106 configured to transport one or more optical signals communicated by components of optical transport network 101. The network elements of optical transport network 101, coupled together by fibers 106, may comprise one or more transmitters 102, one or more multiplexers (MUX) 104, one or more optical amplifiers 108, one or more optical add/drop multiplexers (OADM) 110, one or more demultiplexers (DEMUX) 105, and one or more receivers 112.

Optical transport network 101 may comprise a point-to-point optical network with terminal nodes, a ring optical network, a mesh optical network, or any other suitable optical network or combination of optical networks. Optical fibers 106 comprise thin strands of glass capable of communicating the signals over long distances with very low loss. Optical fibers 106 may comprise a suitable type of fiber selected from a variety of different fibers for optical transmission.

Optical transport network 101 may include devices configured to transmit optical signals over optical fibers 106. Information may be transmitted and received through optical transport network 101 by modulation of one or more wavelengths of light to encode the information on the wavelength. In optical networking, a wavelength of light may also be referred to as a channel. Each channel may be configured to carry a certain amount of information through optical transport network 101.

To increase the information capacity and transport capabilities of optical transport network 101, multiple signals transmitted at multiple channels may be combined into a single wideband optical signal. The process of communicating information at multiple channels is referred to in optics as wavelength division multiplexing (WDM). Coarse wavelength division multiplexing (CWDM) refers to the multiplexing of wavelengths that are widely spaced having low number of channels, usually greater than 20 nm and less than sixteen wavelengths, and dense wavelength division multiplexing (DWDM) refers to the multiplexing of wavelengths that are closely spaced having large number of channels, usually less than 0.8 nm spacing and greater than forty wavelengths, into a fiber. WDM or other multi-wavelength multiplexing transmission techniques are employed in optical networks to increase the aggregate bandwidth per optical fiber. Without WDM, the bandwidth in optical networks may be limited to the bit-rate of solely one wavelength. With more bandwidth, optical networks are capable of transmitting greater amounts of information. Optical transport network 101 may be configured to transmit disparate channels using WDM or some other suitable multi-channel multiplexing technique, and to amplify the multi-channel signal.

Optical transport network 101 may include one or more optical transmitters (Tx) 102 configured to transmit optical signals through optical transport network 101 in specific wavelengths or channels. Transmitters 102 may comprise a system, apparatus or device configured to convert an electrical signal into an optical signal and transmit the optical signal. For example, transmitters 102 may each comprise a laser and a modulator to receive electrical signals and modulate the information contained in the electrical signals onto a beam of light produced by the laser at a particular wavelength, and transmit the beam for carrying the signal throughout optical transport network 101.

Multiplexer 104 may be coupled to transmitters 102 and may be a system, apparatus or device configured to combine the signals transmitted by transmitters 102, e.g., at respective individual wavelengths, into a WDM signal.

Optical amplifiers 108 may amplify the multi-channeled signals within optical transport network 101. Optical amplifiers 108 may be positioned before and after certain lengths of fiber 106. Optical amplifiers 108 may comprise a system, apparatus, or device configured to amplify optical signals. For example, optical amplifiers 108 may comprise an optical repeater that amplifies the optical signal. This amplification may be performed with opto-electrical or electro-optical conversion. In some embodiments, optical amplifiers 108 may comprise an optical fiber doped with a rare-earth element to form a doped fiber amplification element. When a signal passes through the fiber, external energy may be applied in the form of a pump signal to excite the atoms of the doped portion of the optical fiber, which increases the intensity of the optical signal. As an example, optical amplifiers 108 may comprise an erbium-doped fiber amplifier (EDFA).

OADMs 110 may be coupled to optical transport network 101 via fibers 106. OADMs 110 comprise an add/drop module, which may include a system, apparatus or device configured to add or drop optical signals (i.e., at individual wavelengths) from fibers 106. After passing through an OADM 110, an optical signal may travel along fibers 106 directly to a destination, or the signal may be passed through one or more additional OADMs 110 and optical amplifiers 108 before reaching a destination.

In certain embodiments of optical transport network 101, OADM 110 may represent a reconfigurable OADM (ROADM) that is capable of adding or dropping individual or multiple wavelengths of a WDM signal. The individual or multiple wavelengths may be added or dropped in the optical domain, for example, using a wavelength selective switch (WSS) (not shown) that may be included in a ROADM.

As shown in FIG. 1, optical transport network 101 may also include one or more demultiplexers 105 at one or more destinations of network 101. Demultiplexer 105 may comprise a system apparatus or device that acts as a demultiplexer by splitting a single composite WDM signal into individual channels at respective wavelengths. For example, optical transport network 101 may transmit and carry a forty (40) channel DWDM signal. Demultiplexer 105 may divide the single, forty channel DWDM signal into forty separate signals according to the forty different channels.

In FIG. 1, optical transport network 101 may also include receivers 112 coupled to demultiplexer 105. Each receiver 112 may be configured to receive optical signals transmitted at a particular wavelength or channel, and may process the optical signals to obtain (e.g., demodulate) the information (i.e., data) that the optical signals contain. Accordingly, network 101 may include at least one receiver 112 for every channel of the network.

Optical networks, such as optical transport network 101 in FIG. 1, may employ modulation techniques to convey information in the optical signals over the optical fibers. Such modulation schemes may include phase-shift keying (PSK), frequency-shift keying (FSK), amplitude-shift keying (ASK), and quadrature amplitude modulation (QAM), among other examples of modulation techniques. In PSK, the information carried by the optical signal may be conveyed by modulating the phase of a reference signal, also known as a carrier wave, or simply, a carrier. The information may be conveyed by modulating the phase of the signal itself using two-level or binary phase-shift keying (BPSK), four-level or quadrature phase-shift keying (QPSK), multi-level phase-shift keying (M-PSK) and differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant. Additionally, polarization division multiplexing (PDM) technology may enable achieving a greater bit rate for information transmission. PDM transmission comprises modulating information onto various polarization components of an optical signal associated with a channel. The polarization of an optical signal may refer to the direction of the oscillations of the optical signal. The term "polarization" may generally refer to the path traced out by the tip of the electric field vector at a point in space, which is perpendicular to the propagation direction of the optical signal.

In an optical network, such as optical transport network 101 in FIG. 1, it is typical to refer to a management plane, a control plane, and a transport plane (sometimes called the physical layer). A central management host (not shown) may reside in the management plane and may configure and supervise the components of the control plane. The management plane includes ultimate control over all transport plane and control plane entities (e.g., network elements). As an example, the management plane may consist of a central processing center (e.g., the central management host), including one or more processing resources, data storage components, etc. The management plane may be in electrical communication with the elements of the control plane and may also be in electrical communication with one or more network elements of the transport plane. The management plane may perform management functions for an overall system and provide coordination between network elements, the control plane, and the transport plane. As examples, the management plane may include an element management system (EMS), which handles one or more network elements from the perspective of the elements, a network management system (NMS), which handles many devices from the perspective of the network, and an operational support system (OSS), which handles network-wide operations.

Modifications, additions or omissions may be made to optical transport network 101 without departing from the scope of the disclosure. For example, optical transport network 101 may include more or fewer elements than those depicted in FIG. 1. Also, as mentioned above, although depicted as a point-to-point network, optical transport network 101 may comprise any suitable network topology for transmitting optical signals such as a ring, a mesh, or a hierarchical network topology.

As discussed above, the amount of information that may be transmitted over an optical network may vary with the number of optical channels coded with information and multiplexed into one signal. Accordingly, an optical fiber employing a WDM signal may carry more information than an optical fiber that carries information over a single channel. Besides the number of channels and number of polarization components carried, another factor that affects how much information can be transmitted over an optical network may be the bit rate of transmission. The higher the bit rate, the greater the transmitted information capacity. Achieving higher bit rates may be limited by the availability of wide bandwidth electrical driver technology, digital signal processor technology and increase in the required OSNR for transmission over optical transport network 101.

As shown in FIG. 1, optical transport network 101 may employ a digital wrapper technology to encapsulate existing frames of data, which may originate in a variety of native protocols, and may add packetized overhead for addressing, management, and quality assurance purposes. The resulting optical signal, in the form of optical data units (ODUs) may then be transported using individual optical wavelengths by optical transport network 101. The packetized overhead may be used to monitor and control the optical signals being transported using any of a variety of different protocols. In particular embodiments, operation of optical transport network 101 is performed according to optical transport networking (OTN) standards or recommendations promulgated by the International Telecommunications Union (ITU), such as ITU-T G.709—"Interfaces for the Optical Transport Network" and ITU-T G.872—"Architecture of the Optical Transport Network", among others. The optical wavelengths in OTN may rely on a hierarchical implementation of time-division multiplexing (TDM) to optimize carrier wavelength efficiency.

As a result of the hierarchical TDM arrangement of the optical signals in OTN, OTN switching may be performed at different sub-wavelength bit rates along optical transport network 101. As used herein, OTN switching refers to switching at ODU paths of different bit rates with the ODU being the atomic unit of switching. In contrast, Internet protocol (IP) switching, such as by an IP router, refers to switching of network signals where an individual IP packet is the atomic unit of switching. In OTN switching, such as in optical transport network 101, an ODU remains in the optical domain outside of an OTN switch from network ingress to network egress. Within the OTN switch, an ODU may be accessed as an electrical domain object and OTN switching may include electrical switching technology.

It is noted that while OTN switching does generally take place in the optical wavelength domain (DWDM), ROADMs and DWDM may be formally referred to as layer0 technologies (in The Basic Reference Model for Open Systems Interconnection, also referred to as the OSI Reference Model). In contrast, OTN may be described as a layer1 technology in the OSI Reference Model, which may operate independently of the optical wavelength domain (DWDM). For example, an OTN switch may theoretically operate over dark fiber, galvanic conductors (such as copper), or over a wireless medium (such as a millimeter-scale wave, or radio frequencies).

In an optical network, such as optical network 101 in FIG. 1, it is typical to refer to a management plane, a control plane, and a transport plane (sometimes called the physical layer). A management host (not shown) may reside in the management plane and may configure and supervise the components of the control plane. The management plane includes ultimate control over all transport plane and control plane entities (e.g., network elements). As an example, the management plane may include a central processing center (e.g., the central management host), including one or more processing resources, data storage components, etc. The management plane may be in electrical communication with the elements of the control plane and may also be in electrical communication with one or more network elements of the transport plane. The management plane may perform management functions for an overall system and provide coordination between network elements, the control plane, and the transport plane. As examples, the management plane may include an element management system (EMS) that may handle one or more network elements from the perspective of the elements, a network management system (NMS) that may handle many devices from the perspective of the network, and/or an operational support system (OSS) that may handle network-wide operations.

In general, the term "distributed" may refer to multiple nodes, or network elements (NEs), interconnected by a network and a set of collaborating nodes (or NEs). As used herein, the term "disaggregated" may refer to a NE in a distributed network that is further reorganized into a set of disaggregated sub-components in a physical sense, as compared to an aggregated physical structure, while maintaining the functionality of an integrated NE in a logical sense. In some embodiments, the disaggregated sub-components may be made openly accessible, in contrast to the aggregated physical structure.

Figure 2:
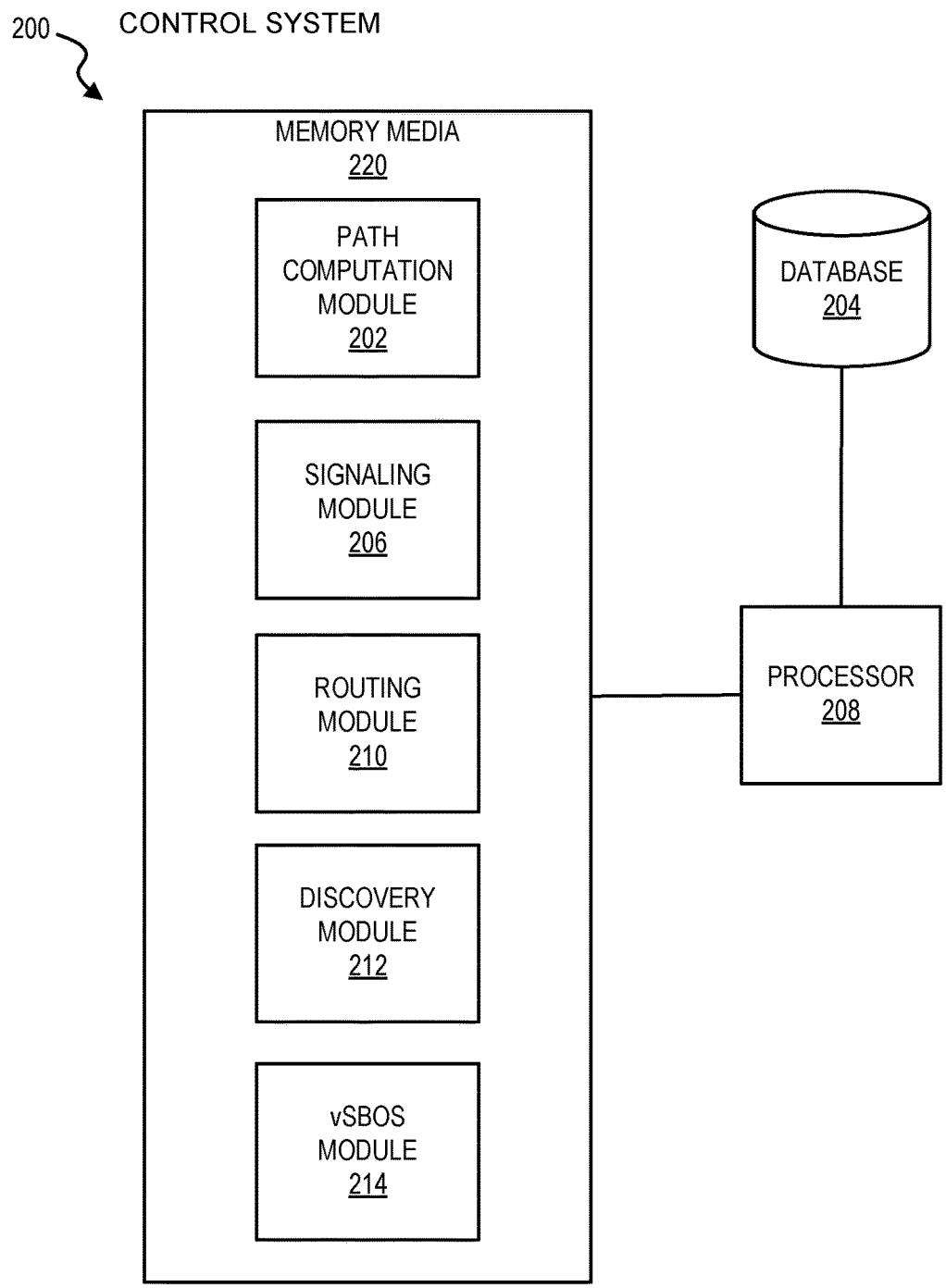
FIG. 2 provides a block diagram of selected elements of a control system for implementing control plane functionality in optical networks, according to one or more embodiments.

Turning now to FIG. 2 a block diagram of selected elements of a control system 200 for implementing control plane functionality in optical networks, such as, for example, in optical network 101 (see FIG. 1), is illustrated, according to one or more embodiments. As shown control system 200 may include a processor 208 and a memory device 220, communicatively coupled to processor 208. In one or more embodiments, memory device 220 may store executable instructions in the form of executable code that may be executable by processor 208 to perform and/or implement one or more functions and operations described herein.

In one or more embodiments, memory device 220 may include one or more of persistent media, volatile media, fixed media, removable media, magnetic media, and semiconductor media, among others. Memory device 220 may include one or more non-transitory computer-readable media that stores data and/or instructions for at least a period of time. Memory device 220 may include storage media or storage devices such as a direct access storage device (e.g., a hard disk drive or floppy disk), a sequential access storage device (e.g., a tape disk drive), compact disk (CD), random access memory (RAM), read-only memory (ROM), CD-ROM, digital versatile disc (DVD), electrically erasable programmable read-only memory (EEPROM), and/or flash memory; non-transitory media; and/or various combinations of the foregoing. Memory device 220 may be operable to store instructions, data, or both.

As shown, memory device may include sets and/or sequences of instructions that may represent executable computer programs. For example, memory device may include a path computation engine module 202, a signaling module 206, a routing module 210, a discovery module 212, and a vSBOS module 214, among others. In one or more embodiments, path computation engine 202, in conjunction with signaling module 206, discovery module 212, routing module 210, and vSBOS module 214 may represent instructions and/or code for implementing one or more systems, processes, flowcharts, and/or methods described herein.

In one or more embodiments, a control plane may include functionality for network intelligence and control and may include applications that support an ability to establish network services, including applications and/or modules for discovery, routing, path computation, signaling, vSBOS provisioning, and/or vSBOS management, among others. For example, the control plane applications executed by control system 200 may work together to automatically establish services within the optical network. In one instance, discovery module 212 may discover local links connecting to neighbors. In a second instance, routing module 210 may broadcast local link information to optical network nodes while populating a database 204. In a third instance, a path computation engine 202 may be utilized to compute a network path utilizing database 204, when a request for service from the optical network is received. In a fourth instance, a signaling module 206 may establish a requested service after receiving the network path from path computation engine 202. In another instance, a vSBOS module 214 may be utilized in vSBOS service provisioning and/or vSBOS service management. In one or more embodiments, one or more of modules 202 through 214 may access and/or utilize database 204 in performing one or more described functionalities described. For example, database 204 may store information associated with one or more backup physical nodes and/or one or more backup optical network connections that may be utilized by vSBOS module 214 in providing vSBOS service provisioning and/or vSBOS service management.

In one or more embodiments, control system 200 may be configured to interface with a user (not shown) and/or receive data about an optical signal transmission path. For example, control system 200 may include and/or may be coupled to one or more input devices and/or output devices to facilitate receiving data about the optical signal transmission path from the user and/or outputting results to the user. For instance the one or more input and/or output devices (not shown) may include one or more of a keyboard, a mouse, a touchpad, a microphone, a display, a touchscreen display, an audio speaker, among others. In one or more embodiments, control system 200 may be configured to receive data about the optical signal transmission path from a device such as another computing device and/or a network element (not shown).

In one or more embodiments, vSBOS module 214 may be configured to provide provisioning and/or resilient virtual optical nodes from less-reliable physical optical nodes. In one example, vSBOS module 214 may create and/or implement a dedicated virtual optical node in response to a vSBOS service request. In a second example, vSBOS module 214 may map each virtual node of a virtual optical node to two or more physical nodes and/or may map a virtual optical connection, linking a pair of virtual nodes, and may map an optical network connection that may communicatively couple a corresponding physical node pair mapped by a virtual node pair. For instance, vSBOS module 214 may map each virtual node of the virtual optical node to a primary physical node and to one or more backup physical nodes, and vSBOS module 214 may map each virtual optical connection to a primary optical network connection and to one or more backup optical network connections, based on connectivity from the physical nodes to data centers interconnected via the virtual optical node. In another example, vSBOS module 214 may dynamically update a virtual node to physical node mapping and/or a virtual optical connection to optical network connection mapping in response to network impairments and/or failures. For instance, vSBOS module 214 may implement a virtual node associated with the impairment and/or the failure and/or may implement a virtual optical connection associated with the impairment and/or the failure with a respective backup.

In one or more embodiments, discovery module 212 may be configured to receive data concerning an optical signal transmission path in an optical network and may be responsible for discovery of neighbors and links between neighbors. For example, discovery module 212 may send discovery messages according to a discovery protocol, and may receive data about the optical signal transmission path. In one or more embodiments, discovery module 212 may determine one or more features, such as, one or more of a fiber type, a fiber length, a number and/or type of components, a data rate, a modulation format of the data, a input power of the optical signal, a number of signal carrying wavelengths (e.g., channels), a channel spacing, a traffic demand, and a network topology, among others.

In one or more embodiments, routing module 210 may be responsible for propagating link connectivity information to various nodes within an optical network, such as optical network 101. For example, routing module 210 may populate database 204 with resource information to support traffic engineering, which may include link bandwidth availability. For instance, routing module 210 may populate database 204 with information usable to determine a network topology of an optical network.

In one or more embodiments, path computation engine 202 may be configured to utilize information stored via database 204 to determine transmission characteristics of an optical signal transmission path. For example, the transmission characteristics of the optical signal transmission path may be utilized in determining how transmission degradation factors, such as chromatic dispersion, nonlinear effects, polarization effects (e.g., polarization mode dispersion, polarization dependent loss, etc.), amplified spontaneous emission and/or others may affect optical signals within the optical signal transmission path. For instance, in determining the transmission characteristics of the optical signal transmission path, path computation engine 202 may utilize interplay between the transmission degradation factors. In one or more embodiments, path computation engine 202 may generate values for transmission degradation factors and/or may store data describing the optical signal transmission path via database 204.

In one or more embodiments, signaling module 206 may provide one or more functionalities associated with one or more of setting up, modifying, and tearing down end-to-end networks services in an optical network (e.g., optical network 101), among others. For example, when an ingress node in the optical network receives a service request, control system 200 may employ signaling module 206 to request a network path from path computation engine 202 that may be optimized according to different criteria, such as bandwidth, cost, etc., and when the desired network path is identified, signaling module 206 may communicate with respective nodes along the network path to establish the requested network services. In one or more embodiments, signaling module 206 may employ a signaling protocol that propagates subsequent communication to and/or from nodes along the network path.

In operation of VON provisioning utilizing implicit encoding of mapping constraints, as described herein, control system 200 may represent and/or include a SDON controller, while path computation engine 202 may include functionality for mapping pattern search and evaluation using implicit encoding of mapping constraints, for example. In this manner, for instance, control system 200 may apply different mapping constraints to select an optimal mapping pattern, such as routing and spectral slot assignments, according to the specific lightpaths requested in one or more VON requests.

In one or more embodiments, utilizing a search that includes a branch and bound search methodology, mapping choices, representing partial mapping patterns that potentially satisfy one or more VON requests, may be evaluated and/or may be rejected based on the mapping constraints before a complete mapping pattern is generated, while remaining mapping choices that are not rejected may result in valid mapping patterns. When at least one valid mapping pattern results from the search, the VON request may be satisfied. When multiple valid mapping patterns result from the evaluation, the SDON controller may select a final mapping pattern based on a lowest occupied number of spectral slots, which has the smallest overall spectral slot usage. In one or more embodiments, a final mapping pattern may be selected based on a lowest spectral slot layer when inter-channel impairments may be present and/or when desirable for optical network operation. It is noted that the search described herein may provide valid mapping patterns without iteration over the entire space of mapping choices. The SDON controller may proceed to reserve the physical network resources according to the selected valid mapping pattern to service the VON request. When no valid mapping patterns are available, the VON request may not be satisfied and/or may be denied.

Figure 3:
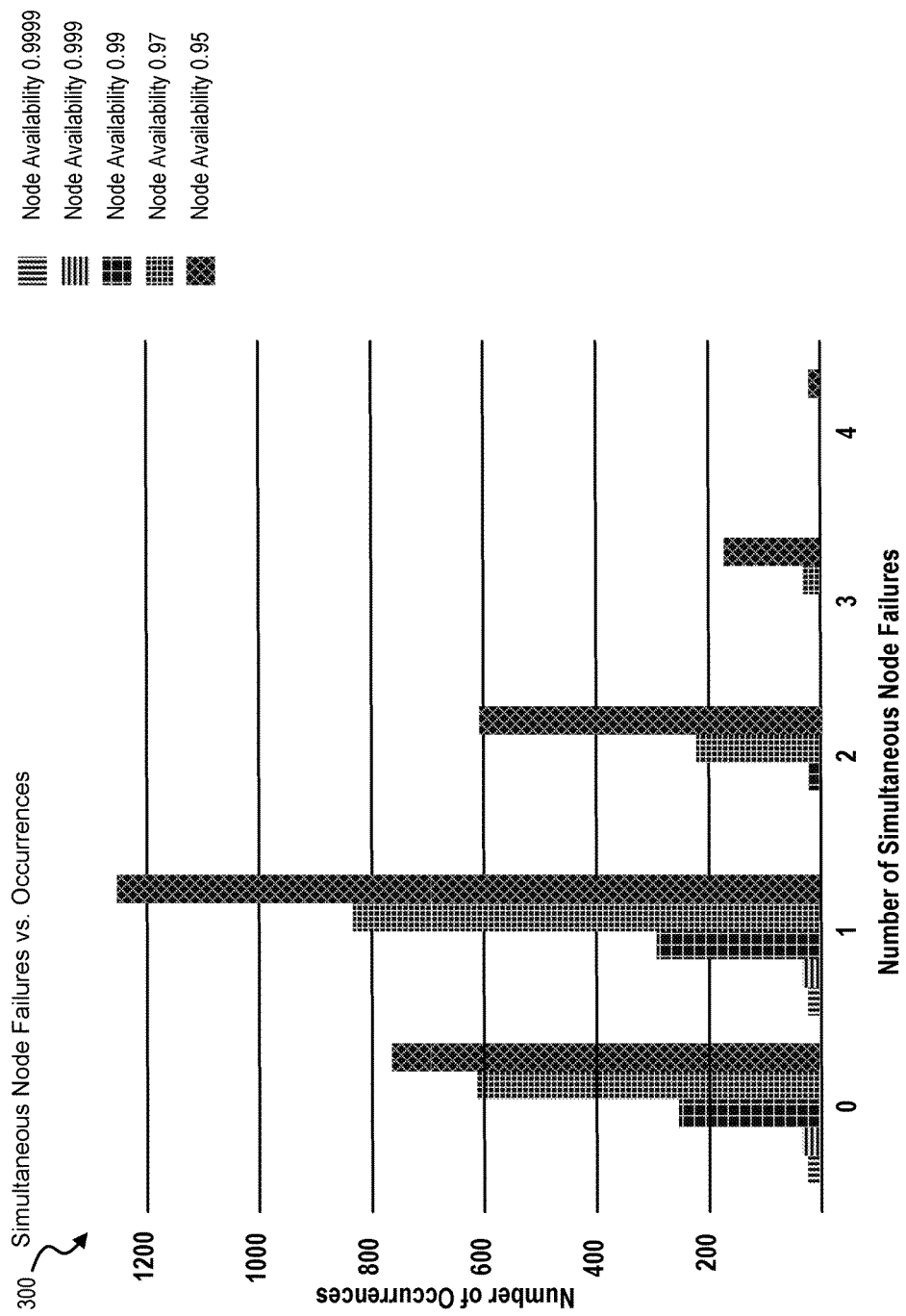
FIGS. 3-4B provide bar graphs that illustrate a number of simultaneous node failures versus a number of occurrences in simulations, according to one or more embodiments.
Figure 4A:
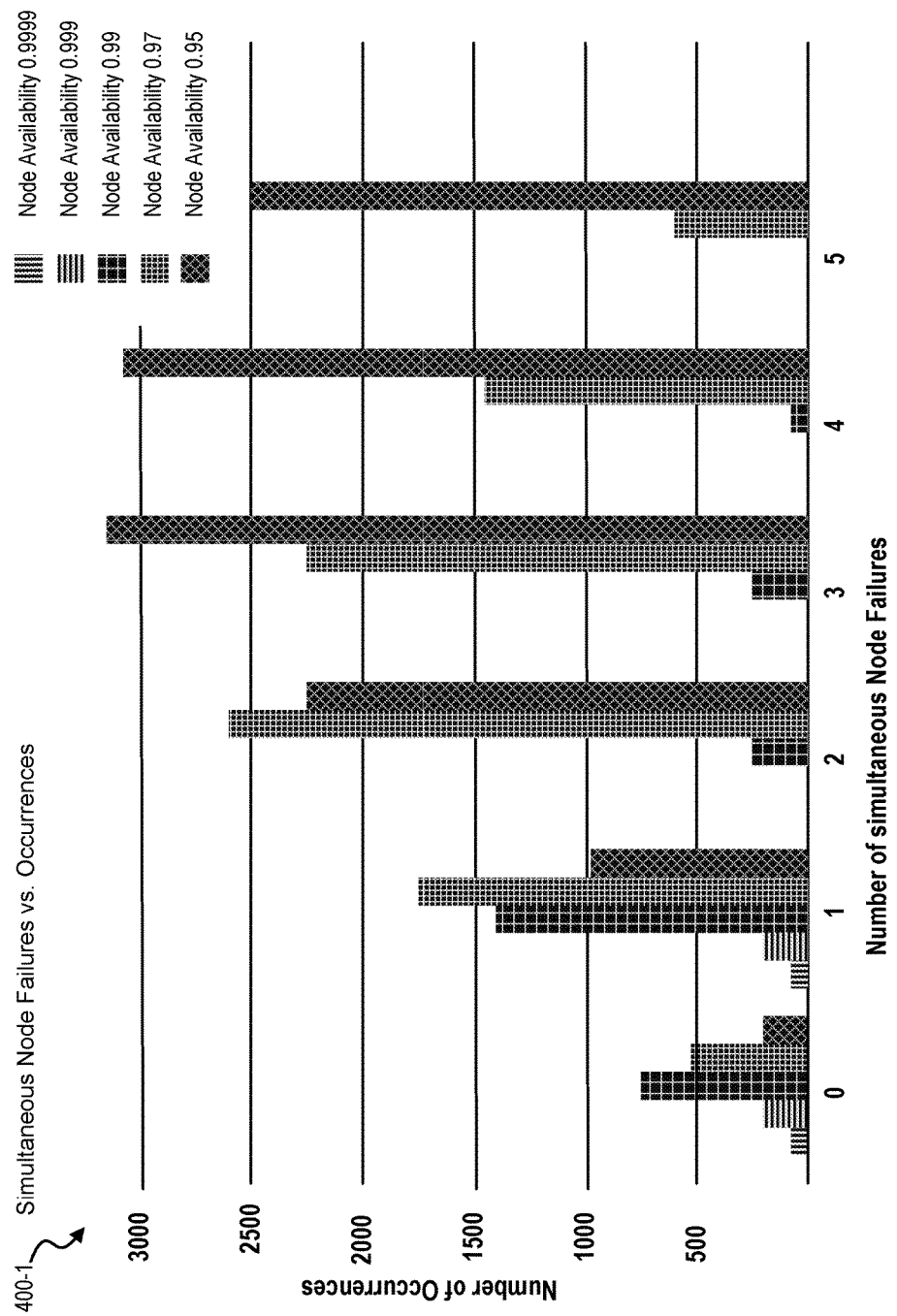
Figure 4B:
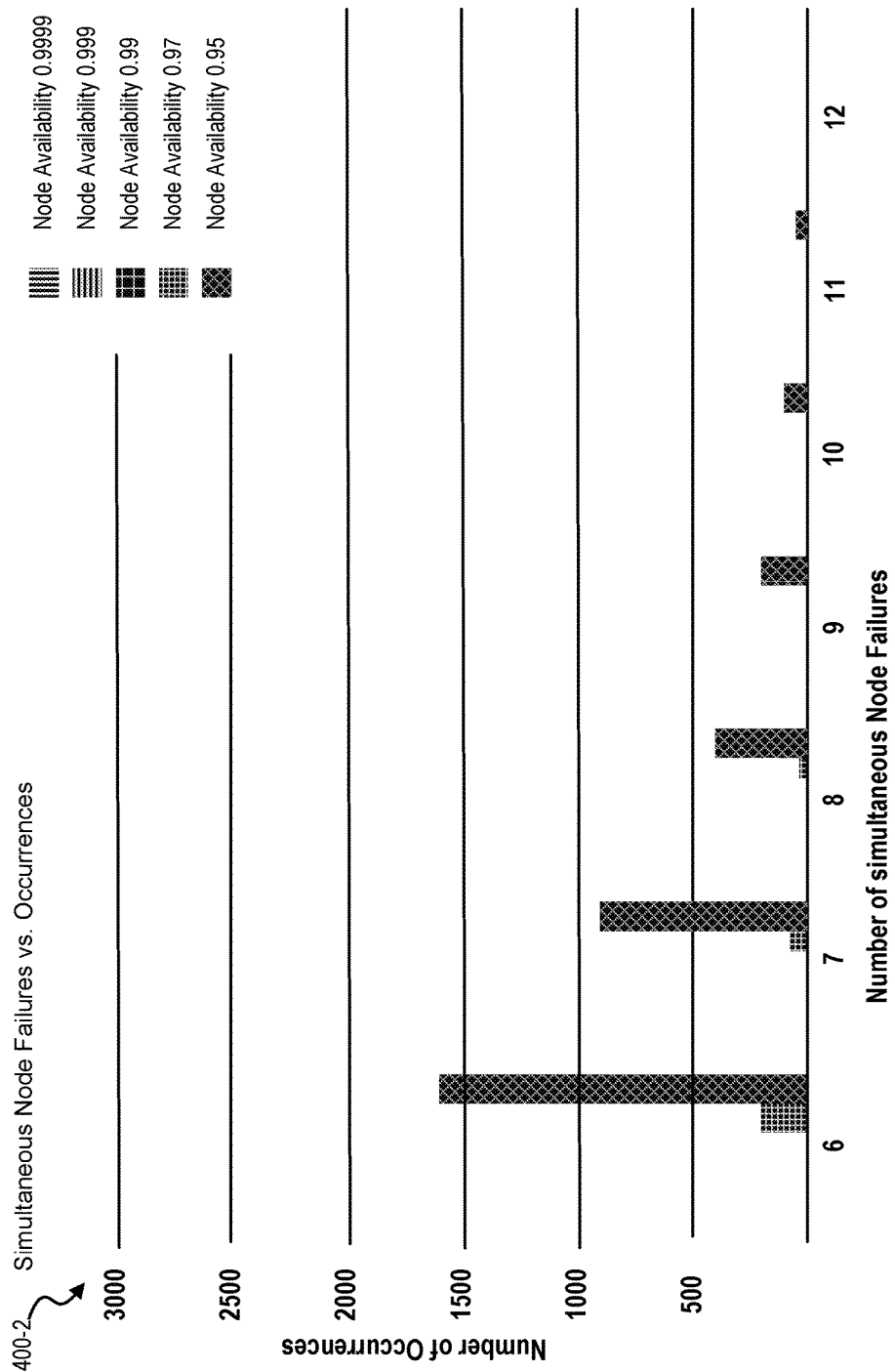

Turning now to FIGS. 3 through 4B, bar graphs that illustrate a number of simultaneous node failures versus a number of occurrences in simulations are provided, according to one or more embodiments. A bar graph 300 of FIG. 3 utilizes data associated with a DTnet (e.g., 14 nodes with 19 links) topology to simulate network failure events caused by equipment failures, and a bar graph 400 of FIGS. 4A and 4B utilizes data associated with a CORONET (e.g., 75 nodes with 99 links) topology to simulate network failure events caused by equipment failures. For example, the equipment subject to failure includes "whiteboxes". For instance, as discussed above, whiteboxes may be similar to bare metal generic personal computers (PCs), sold by multiple vendors, varying in quality and price. Although some vendors may strive to offer whiteboxes with excellent reliability, products from some other vendors and/or some low-end models may have less satisfactory (or even unpredictable) reliability.

The simulations assume that all nodes in the network are whiteboxes with the same level of Node Availability (NA). For example, the NA can be defined as NA=MTTF/(MTTF+MTTR), where MTTF stands for Mean Time To Failure and MTTR stands for Mean Time To Repair. For instance, if each node operates continuously for an average of ninety-nine (99) days before failure occurs (MTTF=99 days), where it can take an average of one (1) day to repair/replace the node (MTTR=1 day), then NA=99/(99+1)=0.99.

During simulation, each node's failure/recovery events occur independently, and a node failure event can follow Poisson arrival, where a time duration for a node recovery follows negative exponential distribution. Each simulation runs for 10,950 time units (corresponding to 30 years when one (1) time unit=one (1) day) with a certain NA, which is gradually lowered from 0.9999 (roughly 1 failure every 10,000 days=27 years) to 0.95 (1 failure every 20 days) per simulation iteration. It is noted that these simulations do not include link failure events (e.g., fiber cut, etc.) independently. In these simulations, a link goes down when a node that the link connects to goes down, and the link comes back on when both nodes the link connects return to working conditions.

FIG. 3 illustrates a histogram of occurrence of simultaneous node failures in DTnet, and FIGS. 4A and 4B illustrate a histogram of occurrence of simultaneous node failures in CORONET. The histograms were obtained as follows. Every time a network encounters a new node failure/recovery event, a time interval between a current event and a previous event constitutes a time period. For each time period, a total number of nodes in the network that are currently in failure state are counted. If, during a simulation there are four (4) time periods where there is no node failure across a network, three (3) time periods where there is one node failure, and two (2) time periods where there are two simultaneous node failures, then the occurrences of 0, 1 and 2 simultaneous-node-failures are 4, 3 and 2, respectively. As shown in FIGS. 3 through 4B, with NA=0.9999, both DTnet and CORONET have either failure-free operation, or encounter a small number of single-node failures.

With optical network equipment engineered with such high reliability existing resiliency solutions against single node/link failure would suffice. Although, with NA=0.999, DTnet and CORONET begin to experience two-simultaneous-node-failures. With NA=0.99 and below, simultaneous node failures become predominant in DTnet and CORONET, and CORONET suffers more higher-count simultaneous-node-failures (such as five nine-simultaneous-node-failures with NA=0.97 and fourteen eleven-simultaneous-node-failures with NA=0.95) due to a larger node count of CORONET. For example, a node availability of 0.999 corresponds to around a three-year product lifecycle (similar to datacenter servers' replacement cycle), and simultaneous node failures become common in networks built with NA 0.999 and below. As such, it may be important to have one or more robust resiliency solutions in place when operating one or more optical networks with potentially less-reliable whiteboxes.

Figure 5A:
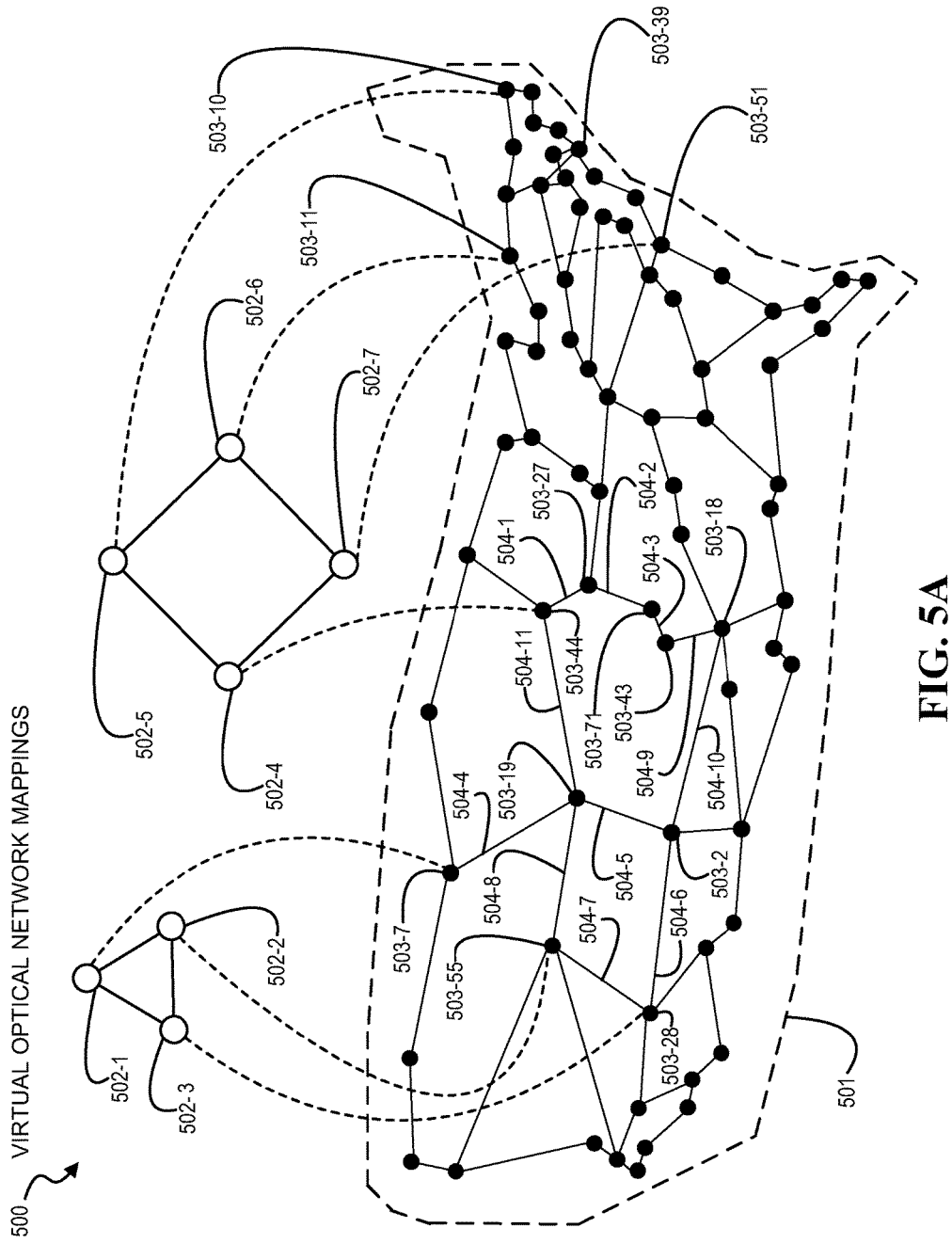
FIG. 5A provides virtual optical network mappings, according to one or more embodiments.

Turning now to FIG. 5A, virtual optical network mappings 500 are provided, according to one or more embodiments. As shown, physical nodes 503 may be distributed in a geographic region 501. In one or more embodiments, a physical node 503 may include one or more computing systems and/or one or more networking devices. For example, a physical node 503 may include one or more systems, devices, and/or functionalities that may be utilized to implement one or more optical network systems and/or one or more VONs.

As illustrated, geographically distributed data centers such as physical nodes 503 may be interconnected via optical network connections 504. In one or more embodiments, physical nodes 503 and optical network connections 504 may form a wide area information and communication technology (ICT) infrastructure that may be utilized in various applications and/or provide high capacity, flexibility, and/or dynamic bandwidth reconfiguration on shorter time scales. In one example, applications such as video content distribution applications may rely on one or more ICT infrastructures to improve users' quality of experience. In another example, applications such as cloud orchestration applications may utilize one or more optical networks and/or one or more ICT infrastructures to provide higher capacity, flexibility and dynamic bandwidth reconfiguration on shorter time scale utilizing one or more software defined networks (SDNs). In one or more embodiments, in multi-tenancy inter-data center network, optical network virtualization may enable network operators to provision multiple coexisting and isolated VONs over same one or more physical infrastructures.

As shown, a first VON may include virtual nodes 502-1, 502-2, and 502-3, and a second VON may include virtual nodes 502-4, 502-5, 502-6, and 502-7. Illustrated via dashed lines, virtual nodes 502-1 through 502-3 may be mapped to physical nodes 503-7, 503-55, and 503-28, respectively, and virtual nodes 502-4 through 502-7 may be mapped to physical nodes 503-44, 503-10, 503-11, and 503-51, respectively.

Figure 5B:
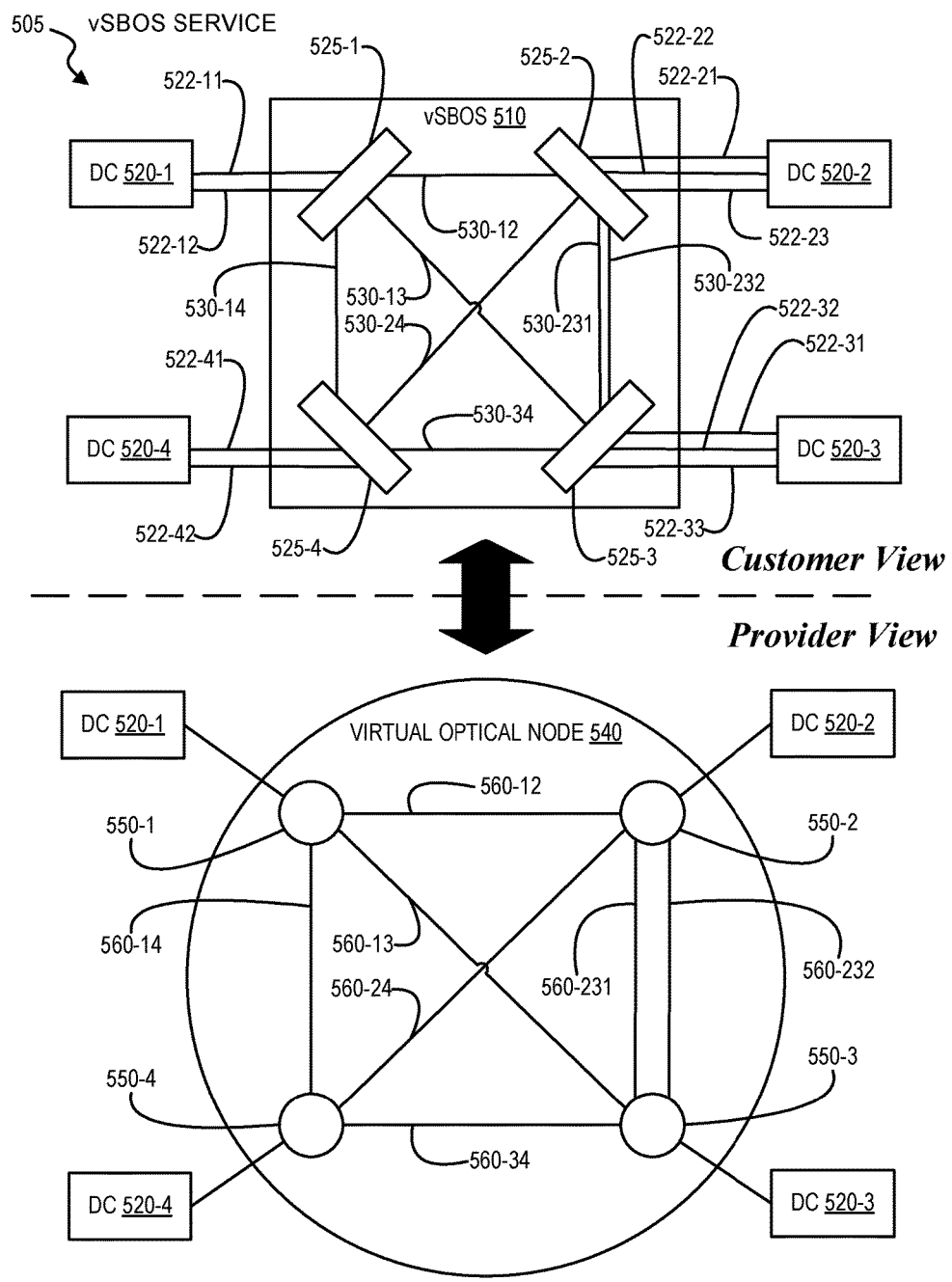
FIG. 5B illustrates a virtual single big optical switch service, according to one or more embodiments.

Turning now to FIG. 5B, a virtual single big optical switch service 505 is illustrated, according to one or more embodiments. As shown, a customer view may include a vSBOS 510. In one or more embodiments, a display and/or screen of a customer may display the customer view. For example, a graphical user interface (GUI) may display the customer view, and the customer may configure vSBOS 510 and/or manage data center (DC) couplings to vSBOS 510 via the GUI. As illustrated, the customer view may display data centers (DCs) 520 coupled to a single "optical" switching hub, such as vSBOS 510. For example, utilizing vSBOS may allow an operator of a DC 520 freedom from managing one or more of an actual physical topology and optical network connections that implement vSBOS 510. For instance, vSBOS 510 may appear to communicatively couple DCs 520 to one another.

Although the reference numerals are utilized via the GUI, the reference numerals may be utilized with their accompanying descriptions and may be also utilized in displaying reference icons and/or graphics via the GUI, according to one or more embodiments. In one example, DC 520 may refer to an icon or graphic in a context of the GUI of the customer view and may refer to a physical DC 520 in another context. In another example, a physical coupling 522 may refer to an icon or graphic in a context of the GUI of the customer view and may refer to a physical coupling 520 in another context.

In one or more embodiments, a DC 520 may be coupled to vSBOS 510 via multiple physical couplings 522. In one example, a physical coupling 522 may couple a DC 520 to a border router (not shown), and the border router may couple the DC 520 to one or more physical nodes (e.g., one or more physical nodes that may implement one or more virtual nodes that may implement vSBOS 510). In another example, a physical coupling 522 may couple a DC 520 to a physical node (e.g., a physical node that may implement a virtual node that may implement vSBOS 510). In one or more embodiments, a DC utilizing multiple couplings to vSBOS 510 may provide further resiliency and/or reliability. For instance, DC 520-1 may be coupled to vSBOS 510 via physical couplings 522-11 and 522-12; DC 520-2 may be coupled to vSBOS 510 via physical couplings 522-21, 522-22 and 522-23; DC 520-3 may be coupled to vSBOS 510 via physical couplings 522-31, 522-32 and 522-33; and DC 520-4 may be coupled to vSBOS 510 via physical couplings 522-41 and 522-42.

In one or more embodiments, a border router may be or include a type of router that may be located near a border between one or more Open Shortest Path First (OSPF) areas. For example, a border router may be utilized to establish a connection between backbone networks and the OSPF areas. In one or more embodiments, a backbone or backbone network may include a portion of a computer network infrastructure that interconnects different networks and provides a path for exchange of data between these different networks. For example, networks may couple to a backbone for long distance communication. For instance, a backbone may include connection points that may be coupled by various mediums for transporting data, such as traditional copper, optical fiber, and/or wireless (e.g., microwave relays, satellites, etc.). In one or more embodiments, one or more physical nodes (e.g., one or more physical nodes that may implement one or more virtual nodes that may implement vSBOS 510) may be coupled to a backbone. For example, a border router may couple a DC 520 to the one or more physical nodes via the backbone.

In one or more embodiments, a border router may be a member of both a main backbone network and one or more specific areas to which it connects. As such, for example, a border router may store and/or maintain separate routing information and/or routing tables regarding a backbone and topologies of the area to which it is connected. In one or more embodiments, a border router may be or include a point of arrival and/or departure for that distributed information passes through to connect to other areas or to a backbone.

As illustrated, vSBOS 510 may include virtual switching elements 525, and DCs 520-1 through 520-4 may be coupled to respective virtual switching elements 525-1 through 525-4. For example, DCs 520-1 through 520-4 may be coupled to respective virtual switching elements 525-1 through 525-4 via border routers (not shown). In one or more embodiments, virtual switching elements 525 may be coupled to one another via vSBOS connections 530. For example, virtual switching elements 525 may be coupled to one another via a full mesh.

As shown, virtual switching elements 525-1 and 525-2 may be communicatively coupled via vSBOS connection 530-12; virtual switching elements 525-1 and 525-4 may be communicatively coupled via vSBOS connection 530-14;

virtual switching elements 525-1 and 525-3 may be communicatively coupled via vSBOS connection 530-13; virtual switching elements 525-2 and 525-4 may be communicatively coupled via vSBOS connection 530-24; and virtual switching elements 525-3 and 525-4 may be communicatively coupled via vSBOS connection 530-34. In one or more embodiments, virtual switching elements 525 may be coupled to one another via multiple vSBOS connections 530. For example, greater and/or additional bandwidth may be provisioned between two switching elements of vSBOS 510 via multiple vSBOS connections 530. As illustrated, virtual switching elements 525-2 and 525-3 may be communicatively coupled via vSBOS connections 530-231 and 530-232.

In one or more embodiments, a vSBOS service may be implemented via virtual nodes. For example, rather than implementing the vSBOS service via physical nodes, the physical nodes may be virtualized. For instance, physical nodes may be virtualized via virtual nodes 550. In one or more embodiments, a vSBOS service request may be provisioned via creating a dedicated virtual optical node. For example, a network provider may implement a vSBOS via a virtual optical node. For instance, a network provider may implement vSBOS 510 via a virtual optical node 540. As shown, virtual optical node 540 may include virtual nodes 550, and data centers 520-1 through 520-4 may be coupled to respective virtual nodes 550-1 through 550-4.

In one or more embodiments, virtual nodes 550 may be coupled to one another via virtual optical connections 560. As shown, virtual nodes 550-1 and 550-2 may be communicatively coupled via virtual optical connection 560-12; virtual nodes 550-1 and 550-4 may be communicatively coupled via virtual optical connection 560-14; virtual nodes 550-1 and 550-3 may be communicatively coupled via virtual optical connection 560-13; virtual nodes 550-2 and 550-4 may be communicatively coupled via virtual optical connection 560-24; and virtual nodes 550-3 and 550-4 may be communicatively coupled via virtual optical connection 560-34. In one or more embodiments, virtual nodes 550 may be coupled to one another via multiple virtual optical connections 560. For example, in implementing greater and/or additional bandwidth of a vSBOS, multiple virtual optical connections may be provisioned between two virtual nodes of virtual optical node 540. As illustrated, virtual nodes 550-2 and 550-3 may be communicatively coupled via virtual optical connections 560-231 and 560-232.

In one or more embodiments, virtual optical node 540 may be implemented via physical nodes that may include less reliable equipment, and virtual optical node 540 may be implemented and/or configured such that virtual nodes 540 may endure one or more impairments and/or one or more failures associated with utilizing the physical nodes that may include less reliable equipment. For example, reliability of virtual optical node 540 may not be diminished when virtual optical node 540 is mapped to multiple physical nodes. For instance, each of one or more virtual nodes 550 of virtual optical node 540 may be mapped to multiple physical nodes, and each of one or more virtual optical connections 560 may be mapped to multiple optical network connections.

In one or more embodiments, one or more mappings may be dynamically updated to restore and/or reestablish a virtual node and/or a virtual optical connection if a network impairment and/or failure occurs. For example, a vSBOS service may be utilized via dynamically updating one or more mappings to restore and/or reestablish a virtual node and/or virtual connection if a network impairment and/or failure occurs. For instance, vSBOS 510 may utilize such a vSBOS service.

Although virtual optical node 540 is illustrated with four virtual nodes 550, various numbers of virtual nodes 550 may be utilized in implementing virtual optical node 540. For example, virtual optical node 540 may be implemented with three, five, six, etc., virtual optical nodes 550. In one or more embodiments, a number of virtual optical nodes 550 may correspond to a number of DCs 520 that are coupled to or are to be coupled to vSBOS 510 and/or virtual optical node 540. For example, the number of virtual optical nodes 550 may correspond to a number of DCs 520 that are or to be interconnected. For instance, the number of virtual optical nodes 550 may be a number of DCs 520 that are or to be interconnected.

Figure 6:
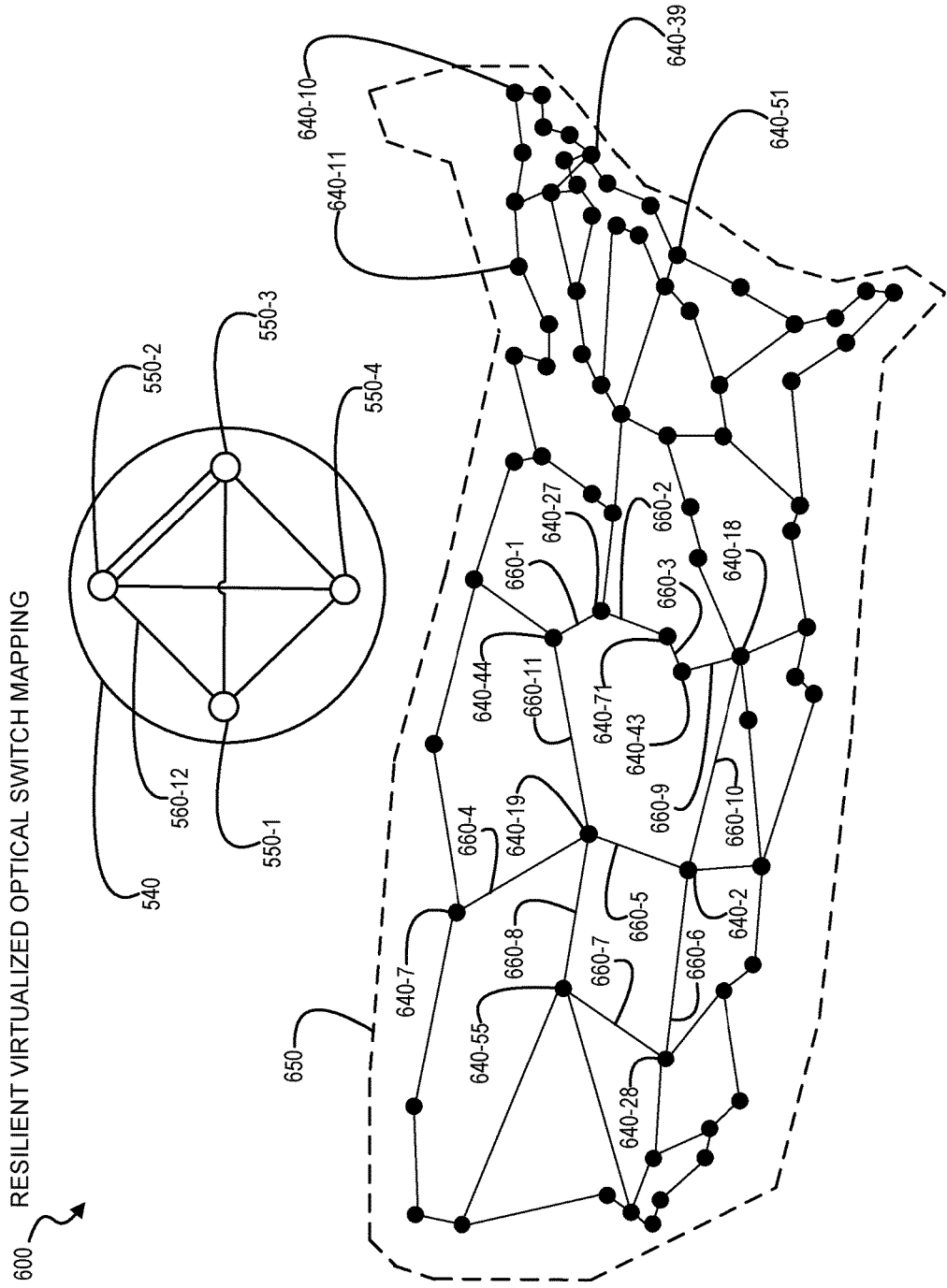
FIG. 6 illustrates a resilient virtual optical switch mapping, according to one or more embodiments.

Turning now to FIG. 6, a resilient virtual optical switch mapping 600 is illustrated, according to one or more embodiments. As shown, physical nodes 640 may be distributed in a geographic region 650. In one or more embodiments, a physical node 640 may include one or more computing systems and/or one or more networking devices. For example, a physical node 640 may include one or more systems, devices, and/or functionalities that may be utilized to implement one or more optical network systems, as referred to previously with reference to physical node 503. For instance, a physical node 640 may include one or more systems, devices, and/or functionalities that may be utilized to implement one or more optical network systems, methods, and/or processes described herein.

In one or more embodiments, virtual nodes 550 and virtual optical connections 560 may be mapped to physical nodes 640 and optical network connections 660 based on one or more of connectivity information, locality information, and resource availability, among others. In one example, the connectivity information may include one or more of a number of spectrum slots (e.g., channels, wavelengths, etc.) between two physical nodes and a bandwidth, among others. In one instance, a less number of spectrum slots may be favorable, as fewer spectrum slots may provide for lesser complexity in information transportation. In another instance, greater bandwidth may be favorable, as greater bandwidth may permit more information to be transported. In a second example, locality information may include one or more physical distances. In another example, determining the network connections for the virtual optical connections may include dynamically routing between physical nodes mapped by a first virtual node and a second virtual node and/or assigning at least one wavelength (e.g., spectral slot) between the physical nodes mapped by the first virtual node and the second virtual node of the virtual optical connection.

In one or more embodiments, a single virtual node 550 may be mapped to one or more physical nodes 640. In one example, if resiliency is not an issue and/or is not a design preference or attribute (e.g., a customer preference or attribute), then single virtual node 550 may be mapped to a single one of physical nodes 640. In another example, if resiliency is an issue and/or is a design preference or attribute (e.g., a customer preference or attribute), then single virtual node 550 may be mapped to multiple physical nodes 640. For instance, if a first physical node of the multiple of physical nodes 640, that is coupled to a data center (e.g., a customer data center such as a data center of data centers 520) and is utilized in implementing single virtual node 550, is subject to impairment and/or failure, then a second physical node of the multiple of physical nodes 640, that is coupled to the data center, may be utilized in place of the first physical node such that single virtual node 550 may continue to operate and/or function with little or no down-time.

In one or more embodiments, a reliability measure and/or a reliability degree of a single virtual node 550 may be based on a number of physical nodes 640 that the single virtual node 550 is mapped. In one example, virtual node 550-1 may be mapped to physical nodes 640-2, 640-28, and 640-55. In a second example, virtual node 550-2 may be mapped to physical nodes 640-43, 640-44, and 640-71. In a third example, virtual node 550-3 may be mapped to physical nodes 640-10 and 640-11. In another example, virtual node 550-4 may be mapped to physical nodes 640-39 and 640-51. In one or more embodiments, a single virtual node may be mapped to a first physical node and a second physical node and may be implemented via either the first physical node or the second physical node. For example, the single virtual node may be mapped to the first physical node that implements the single virtual node. For instance, at a point in time, the first physical nodes is subject to impairment and/or failure, and the single virtual node may be mapped or remapped to the second physical node that implements the single virtual node.

In one or more embodiments, virtual optical connections may be mapped to one or more optical network connections that communicatively couple physical nodes. For example, a reliability measure and/or a reliability degree of a single virtual optical connection may be based on a number of optical network connections that a single virtual optical connection (e.g., virtual optical connection 560) is mapped. In one instance, a virtual optical connection may be mapped to a single optical connection between two physical nodes. In another instance, a virtual optical connection may be mapped to multiple optical connections.

In one or more embodiments, a virtual optical connection may be mapped to multiple optical connections, utilizing one or more physical nodes to link the multiple optical connections. In one example, virtual optical connection 560-12 may be mapped to optical network connection 660-8, physical node 640-19, and optical network connection 660-11. In another example, virtual optical connection 560-12 may be mapped to optical network connection 660-7, physical node 640-28, optical network connection 660-6, physical node 640-2, optical network connection 660-5, physical node 640-19, and optical network connection 660-11. In another example, virtual optical connection 560-12 may be mapped to optical network connection 660-7, physical node 640-28, optical network connection 660-6, physical node 640-2, optical network connection 660-10, physical node 640-18, optical network connection 660-9, physical node 640-43, optical network connection 660-3, physical node 640-71, optical network connection 660-2, physical node 640-27, and optical network connection 660-1. For instance, if there is an impairment and/or failure with a physical node or an optical network connection of a virtual optical connection mapping, another virtual optical network mapping may be utilized. Although, these examples utilize specific routes between specific physical nodes utilized by virtual nodes 550-1 and 550-2, other mappings may be utilized for other physical nodes utilized by virtual nodes 550-1 and 550-2, and/or other mappings may be utilized for other physical nodes utilized by other virtual nodes, according to one or more embodiments.

Figure 7:
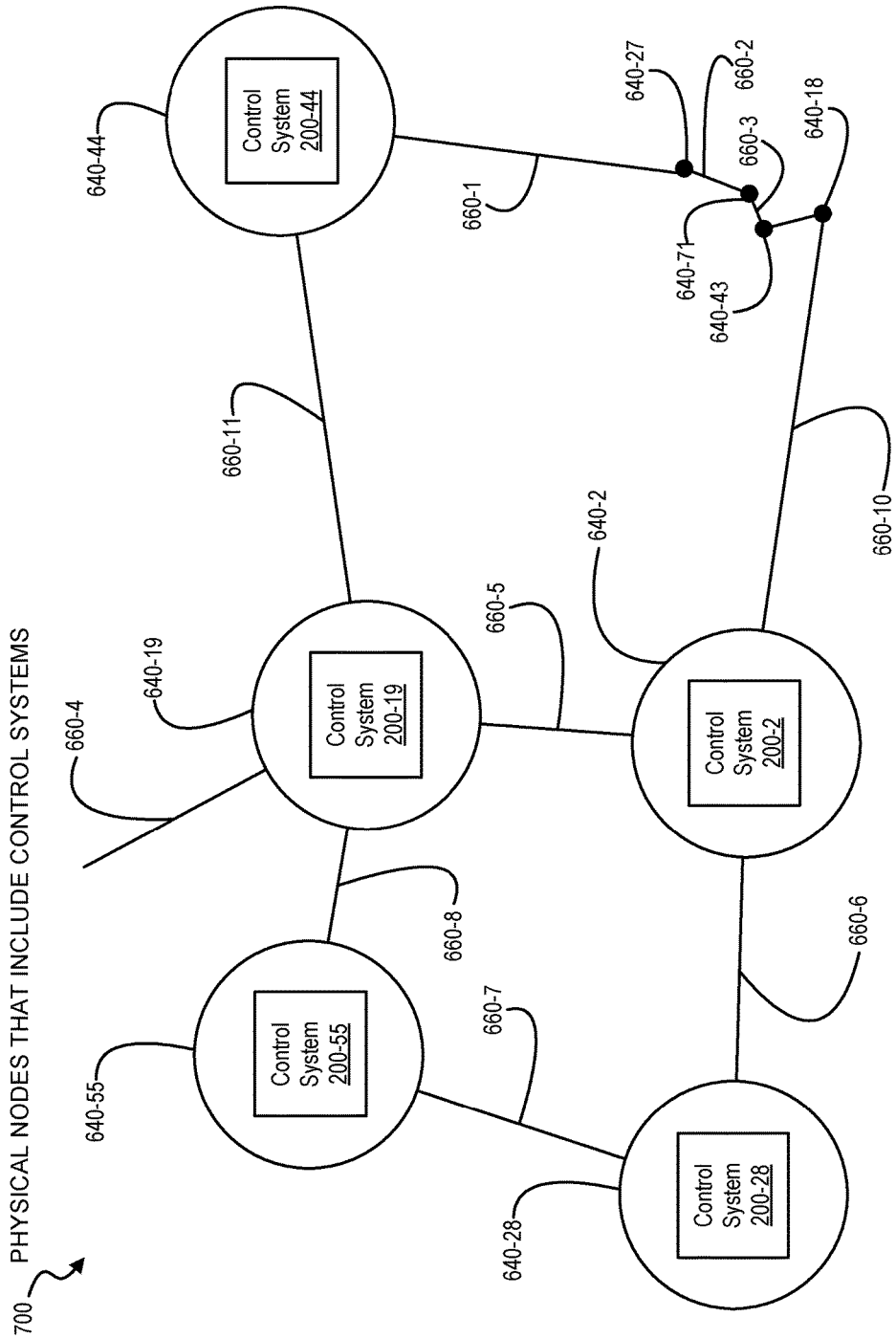
FIG. 7 provides a schematic diagram of physical nodes that include control systems, according to one or more embodiments.

Turning now to FIG. 7, a schematic diagram 700 of physical nodes 640 that include control systems 200 is illustrated, according to one or more embodiments. As shown, diagram 700 provides a portion of physical nodes and optical connections illustrated in FIG. 6. As illustrated in FIG. 7, physical nodes 640-2, 640-19, 640-28, 640-44, and 640-55 may include respective control systems 200-2, 200-19, 200-28, 200-44, and 200-55.

In one or more embodiments, a control system 200 may monitor performance and/or operability of one or more optical network connections and/or one or more physical nodes. In one example, control system 200-19 may monitor performance and/or operability of one or more optical network connections 660-4, 660-5, 660-8, and 660-11, among others, and/or physical nodes 640-2, 640-19, 640-28, 640-44, and 640-55, among others. In a second example, control system 200-28 may monitor performance and/or operability of one or more optical network connections 660-6 and 660-7, among others, and/or physical nodes 640-2, 640-19, 640-28, 640-44, and 640-55, among others. In another example, control system 200-2 may monitor performance and/or operability of one or more optical network connections 660-5, 660-6 and 660-10, among others, and/or physical nodes 640-2, 640-19, 640-28, 640-44, and 640-55, among others.

In one or more embodiments, one or more control systems 200 may detect one or more physical node impairments and/or failures and/or may detect one or more optical network connection impairments and/or failures. For example, the physical nodes and/or optical network connections may be monitored for performance and/or operability to detect one or more physical node impairments and/or failures and/or to detect one or more optical network connection impairments and/or failures.

In one or more embodiments, one or more control systems 200 may remap one or more virtual nodes and/or virtual connections in response to detecting one or more physical node impairments and/or failures and/or in response to detecting one or more optical network connection impairments and/or failures. In one example, virtual node 550-1 may be mapped to physical nodes 640-2, 640-28, and 640-55 and initially mapped to and/or implemented via physical node 640-2, and one or more of control systems 200 may remap and/or implement virtual node 550-1 via physical node 640-28 or physical node 640-55. For instance, after remapping virtual node 550-1 to physical node 640-28 or physical node 640-55, virtual node 550-1 may be implemented via physical node 640-28 or physical node 640-55.

In a second example, virtual node 550-1 may be mapped to physical node 640-2, virtual node 550-2 may be mapped to physical node 640-19, and virtual connection 560-12 may be mapped to optical network connection 660-5, and optical network connection 660-5 may be subject to impairment and/or failure. In one instance, virtual connection 560-12 may be mapped or remapped via optical network connection 660-6, physical node 640-28, optical network connection 660-7, physical node 640-55, and optical network connection 660-8. In a second instance, virtual node 550-1 may be mapped or remapped to physical node 640-28, and virtual connection 560-12 may be mapped or remapped via optical network connection 660-7, physical node 640-55, and optical network connection 660-8. In another instance, virtual node 550-1 may be mapped or remapped to physical node 640-55, and virtual connection 560-12 may be mapped or remapped to optical network connection 660-8.

Figure 8:
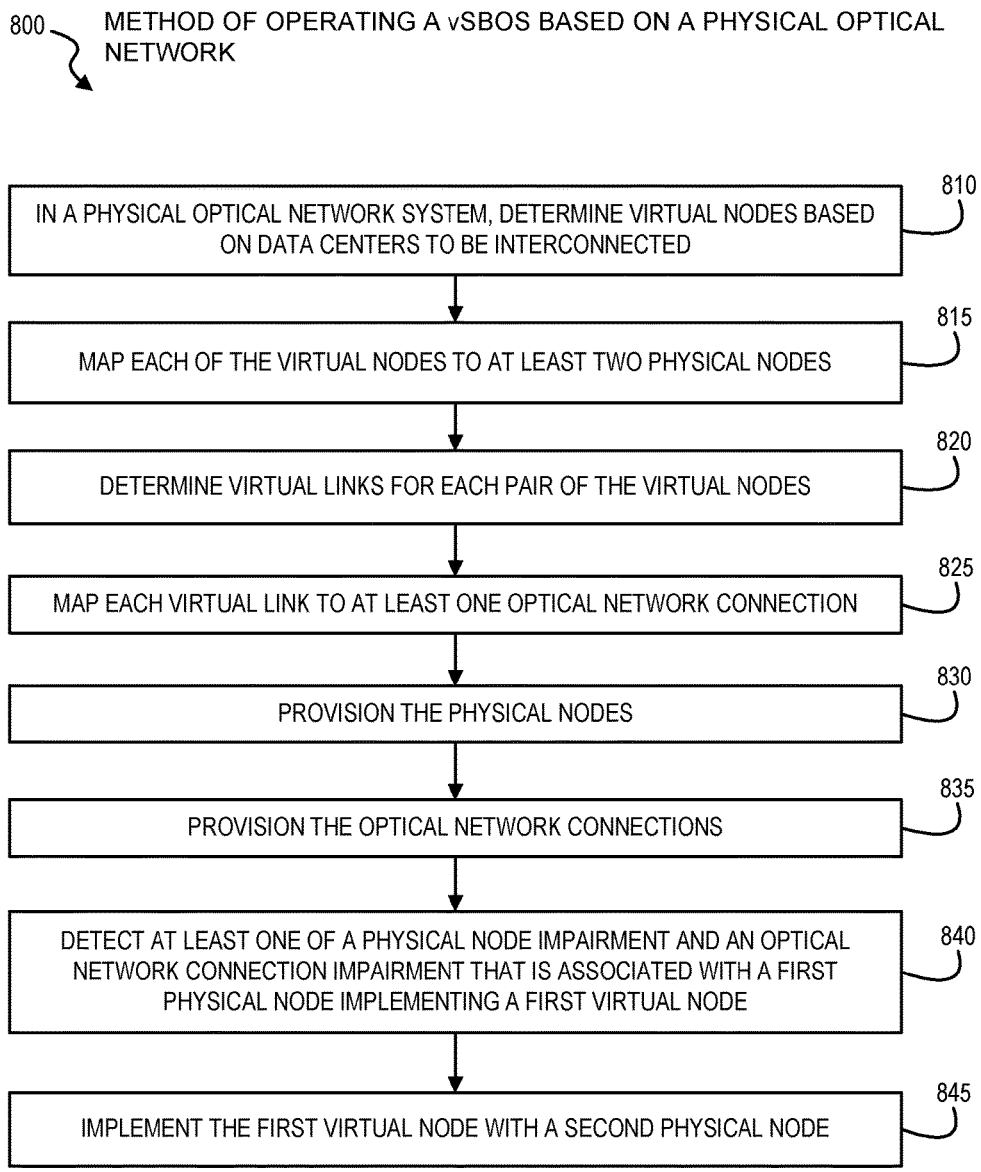
FIG. 8 illustrates a method of operating optical networks, according to one or more embodiments.

Turning now to FIG. 8, a method 800 of operating a vSBOS based on a physical optical network is provided, according to one or more embodiments. At step 810, in a physical optical network system, virtual nodes may be determined, based on data centers to be interconnected. In one or more embodiments, the virtual nodes may be included in a virtual optical node that provides a vSBOS. At step 815, each of the virtual nodes may be mapped to at least two physical nodes. In one or more embodiments, multiple physical nodes may be available via a physical optical network, and each of the virtual nodes may be mapped to at least two physical nodes of the available physical nodes. For example, a virtual node may be mapped to a first physical node and to a second physical node of the available physical nodes. For instance, the first physical node may implement the virtual node, and the second physical node may implement the physical node when the first physical node is not implementing the virtual node.

In one or more embodiments, availability of a physical node may be determined via one or more physical couplings of a data center to the physical node. In one example, DC 520-1 may be coupled to physical nodes 640-2 and 640-28 via respective physical couplings 522-11 and 522-12 permitting physical nodes 640-2 and 640-28 to be available for virtual node 550-1 to be mapped. In a second example, DC 520-2 may be coupled to physical nodes 640-43, 640-44, and 640-71 via respective physical couplings 522-21, 522-22, and 522-23 permitting physical nodes 640-43, 640-44, and 640-71 to be available for virtual node 550-1 to be mapped.

At step 820, virtual links (e.g., virtual optical connections) may be determined for pairs of the virtual nodes. In one or more embodiments, at least one virtual link may be determined for each pair of the virtual nodes. In one example, a single virtual link may be determined for a first pair of the virtual nodes. For instance, virtual optical connection 560-12 may be determined for virtual nodes 550-1 and 550-2 (in FIG. 5B). In another example, multiple virtual links may be determined for a second pair of the virtual nodes. For instance, virtual optical connections 560-231 and 560-232 may be determined for virtual nodes 550-2 and 550-3 (in FIG. 5B).

At step 825, each of the virtual links may be mapped to at least one optical network connection. At step 830, the physical nodes may be provisioned. In one example, virtual node 550-1 may be mapped to physical nodes 640-2, 640-28, and 640-55, and physical nodes 640-2, 640-28, and 640-55 may be provisioned for virtual node 550-1. In another example, virtual node 550-4 may be mapped to physical nodes 640-39 and 640-51, and physical nodes 640-39 and 640-51 may be provisioned for virtual node 550-4.

In one or more embodiments, provisioning the physical nodes mapped to each virtual node may include configuring one or more control systems 200 of respective one or more physical nodes 640. For example, configuring the one or more control systems 200 of the respective one or more physical nodes 640 may include configuring the one or more control systems 200 of respective the one or more physical nodes 640 to perform one or more processes and/or methods described herein. In one instance, the one or more control systems 200 of respective the one or more physical nodes 640 may be configured to restore and/or reestablish a virtual node and/or a virtual optical connection if a network impairment and/or failure occurs. In another instance, the one or more control systems 200 of respective the one or more physical nodes 640 may be configured to map or remap a single virtual node to a second physical node (e.g., a backup physical node) if, at a point in time, a first physical nodes that implements the single virtual node is subject to impairment and/or failure.

At step 835, the optical network connections mapped to the virtual links may be provisioned. In one example, virtual optical connection (e.g., virtual link) 560-12 may be mapped to optical network connection 660-8, and optical network connection 660-8 may be provisioned. In another example, virtual optical connection 560-13 may be mapped to optical network connection 660-11, and optical network connection 660-11 may be provisioned. In one or more embodiments, provisioning at least one optical network connection mapped to each virtual link may include configuring one or more control systems 200 of respective one or more physical nodes 640. For example, configuring the one or more control systems 200 of respective the one or more physical nodes 640 may include configuring the one or more control systems 200 of respective the one or more physical nodes 640 to perform one or more processes and/or methods described herein.

At step 840, at least one of a physical node impairment and an optical network connection impairment that is associated with a first physical node implementing a first virtual node may be detected. For example, the first virtual node may be virtual node 550-2, mapped to physical nodes 640-43, 640-44, and 640-71, implemented via physical node 640-43, and utilizing physical optical network connection 660-3. For instance, an impairment and/or a failure of physical node 640-43 and/or physical optical network connection 660-3 may be detected.

At step 845, the first virtual node may be implemented with a second physical node. For example, virtual node 550-2 may be implemented via physical node 640-71 in response to detecting the impairment and/or the failure of physical node 640-43 and/or physical optical network connection 660-3. For instance, physical node 640-71 may utilize physical optical network connection 660-2 for a virtual optical connection (e.g., virtual link) associated with virtual node 550-2.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method of operating optical networks, the method comprising:
   determining a plurality of virtual nodes based on a plurality of data centers to be interconnected;
   mapping each virtual node of the plurality of virtual nodes to at least two physical nodes of a plurality of physical nodes;
   determining a plurality of virtual links for pairs of the plurality of virtual nodes;
   mapping each virtual link of the plurality of virtual links to at least one optical network connection of a plurality of optical network connections; and
   provisioning the plurality of physical nodes.

2. The method of claim 1, further comprising:
   detecting at least one of a physical node impairment and an optical network connection impairment that is associated with a first physical node of the plurality of physical nodes implementing a first virtual node of the plurality of virtual nodes; and
   implementing the first virtual node with a second physical node of the plurality of physical nodes.

3. The method of claim 1, further comprising:
provisioning the plurality of optical network connections.

4. The method of claim 1, wherein the determining the plurality of virtual links for pairs of the plurality of virtual nodes includes:
dynamically routing between the plurality of physical nodes mapped by a first virtual node of the plurality of virtual nodes and a second virtual node of the plurality of virtual nodes; and
assigning at least one wavelength between the physical nodes mapped by the first virtual node and the second virtual node of the virtual link.

5. The method of claim 2, further comprising:
implementing the first virtual node with the first physical node based on first connectivity to a first data center of the plurality of data centers, wherein the first connectivity is based on at least one of a first number of spectrum slots and a first bandwidth.

6. The method of claim 5, further comprising:
determining the second physical node as a backup physical node for the first virtual node based on second connectivity to the first data center of the plurality of data centers, wherein the second connectivity is based on at least one of a second number of spectrum slots and a second bandwidth.

7. The method of claim 6, wherein at least one of the first number of spectrum slots and the first bandwidth is different from a respective one of the second number of spectrum slots and the second bandwidth.

8. A system that operates optical networks, the system comprising:
a processor configured to access computer readable memory media, wherein the memory media store processor-executable instructions, the instructions, when executed by the processor, cause the processor to:
determine a plurality of virtual nodes based on a plurality of data centers to be interconnected;
map each virtual node of the plurality of virtual nodes to at least two physical nodes of a plurality of physical nodes;
determine a plurality of virtual links for pairs of the plurality of virtual nodes;
map each virtual link of the plurality of virtual links to at least one optical network connection of a plurality of optical network connections; and
provision the plurality of physical nodes.

9. The system of claim 8, wherein the memory media further store processor-executable instructions, that when executed by the processor, cause the processor to:
detect at least one of a physical node impairment and an optical network connection impairment that is associated with a first physical node of the plurality of physical nodes implementing a first virtual node of the plurality of virtual nodes; and
implement the first virtual node with a second physical node of the plurality of physical nodes.

10. The system of claim 8, wherein the memory media further store processor-executable instructions, that when executed by the processor, cause the processor to:
determine the plurality of physical nodes; and
determine the plurality of optical network connections for the plurality of virtual links.

11. The system of claim 8, wherein the instructions to determine the plurality of virtual links for pairs of the plurality of virtual nodes cause the processor to:
dynamically route between the plurality of physical nodes mapped by a first virtual node of the plurality of virtual nodes and a second virtual node of the plurality of virtual nodes; and
assign at least one wavelength between the physical nodes mapped by the first virtual node and the second virtual node of the virtual link.

12. The system of claim 9, wherein the memory media further store processor-executable instructions, that when executed by the processor, cause the processor to:
implement the first virtual node with the first physical node based on first connectivity to a first data center of the plurality of data centers, wherein the first connectivity is based on at least one of a first number of spectrum slots and a first bandwidth.

13. The system of claim 12, wherein the memory media further store processor-executable instructions, that when executed by the processor, cause the processor to:
determine the second physical node as a backup physical node for the first virtual node based on second connectivity to the first data center of the plurality of data centers, wherein the second connectivity is based on at least one of a second number of spectrum slots and a second bandwidth.

14. The system of claim 13, wherein at least one of the first number of spectrum slots and the first bandwidth is different from a respective one of the second number of spectrum slots and the second bandwidth.

15. A non-transitory computer readable memory device that stores processor-executable instructions, that when executed by a processor, cause the processor to:
determine a plurality of virtual nodes based on a plurality of data centers to be interconnected;
map each virtual node of the plurality of virtual nodes to at least two physical nodes of a plurality of physical nodes;
determine a plurality of virtual links for pairs of the plurality of virtual nodes;
map each virtual link of the plurality of virtual links to at least one optical network connection of a plurality of optical network connections; and
provision the plurality of physical nodes.

16. The memory device of claim 15, wherein the memory device further stores processor-executable instructions, that when executed by the processor, cause the processor to:
detect at least one of a physical node impairment and an optical network connection impairment that is associated with a first physical node of the plurality of physical nodes implementing a first virtual node of the plurality of virtual nodes; and
implement the first virtual node with a second physical node of the plurality of physical nodes.

17. The memory device of claim 15, wherein the memory device further stores processor-executable instructions, that when executed by the processor, cause the processor to:
provision the plurality of optical network connections.

18. The memory device of claim 16, wherein the memory device further stores processor-executable instructions, that when executed by the processor, cause the processor to:
implement the first virtual node with the first physical node based on first connectivity to a first data center of the plurality of data centers, wherein the first connectivity is based on at least one of a first number of spectrum slots and a first bandwidth.

19. The memory device of claim 18, wherein the memory device further stores processor-executable instructions, that when executed by the processor, cause the processor to:

determine the second physical node as a backup physical node for the first virtual node based on second connectivity to the first data center of the plurality of data centers, wherein the second connectivity is based on at least one of a second number of spectrum slots and a second bandwidth.

20. The memory device of claim 19, wherein at least one of the first number of spectrum slots and the first bandwidth is different from a respective one of the second number of available add/drop ports of the second number of spectrum slots and the second bandwidth.

* * * * *